United States Patent
Risvik et al.

(10) Patent No.: US 7,240,064 B2
(45) Date of Patent: Jul. 3, 2007

(54) SEARCH ENGINE WITH HIERARCHICALLY STORED INDICES

(75) Inventors: Knut Magne Risvik, Trondheim (NO); Yngve Aasheim, Trondheim (NO); Tor Egge, Trondheim (NO); Håvard Pettersen, Trondheim (NO)

(73) Assignee: Overture Services, Inc., Pasadena, CA (US)

( * ) Notice: Subject to any disclaimer, the term of this patent is extended or adjusted under 35 U.S.C. 154(b) by 187 days.

(21) Appl. No.: 10/705,641

(22) Filed: Nov. 10, 2003

(65) Prior Publication Data

US 2005/0102270 A1    May 12, 2005

(51) Int. Cl.
*G06F 7/00*    (2006.01)

(52) U.S. Cl. .............................. 707/100; 707/1; 707/3; 707/7

(58) Field of Classification Search .................... 707/2, 707/3, 5, 10, 102, 7
See application file for complete search history.

(56) References Cited

U.S. PATENT DOCUMENTS

| | | | | |
|---|---|---|---|---|
| 5,305,208 A | * | 4/1994 | Doi et al. ................... 715/502 |
| 5,694,593 A | * | 12/1997 | Baclawski ..................... 707/5 |
| 5,787,435 A | * | 7/1998 | Burrows ..................... 707/102 |
| 5,913,215 A | * | 6/1999 | Rubinstein et al. ............ 707/10 |
| 6,360,215 B1 | * | 3/2002 | Judd et al. ....................... 707/3 |
| 6,778,977 B1 | * | 8/2004 | Avadhanam et al. ............ 707/2 |
| 6,804,675 B1 | * | 10/2004 | Knight et al. .................. 707/10 |
| 6,928,452 B2 | * | 8/2005 | De La Huerga ............ 707/102 |
| 2001/0011268 A1 | * | 8/2001 | Tsuchida et al. ............... 707/2 |
| 2003/0135490 A1 | * | 7/2003 | Barrett et al. ................... 707/3 |

* cited by examiner

*Primary Examiner*—Cheyne D. Ly
(74) *Attorney, Agent, or Firm*—Breier LLP

(57) ABSTRACT

A search engine comprising a crawler which crawls the WWW and stores pages found on the WWW in a database. An indexer indexes the pages in the database to produce a primary index. A document mapping section maps pages in the database into a plurality of tiers based on a ranking of the pages. The ranking may be based on portions of the pages which have a relatively higher value context. A processor produces a plurality of sub-indices from the primary index based on the mapping. The sub-indices are stored in a search node cluster. The cluster is a matrix of search nodes logically arranged in a plurality of rows and columns. Search nodes in the same column include the same sub-index. Search nodes in the same row include distinct sub-indices. A search query received by a user is sent to a dispatcher which, in turn, forwards the query to the first tier of search nodes. A fall through algorithm is disclosed which indicates when the dispatcher should forward the search query to other tiers of search nodes.

17 Claims, 9 Drawing Sheets

| TIER JUMP | HITLIMIT | PERCENTLIMIT | RANKLIMIT | TERMRANKLIMIT | MINHITS |
|---|---|---|---|---|---|
| (0+1)-2 | 8100 | 50 | 200 | 0 | 100 |
| 2-3 | 8100 | 70 | 200 | 0 | 100 |
| 3-4 | 8100 | 50 | 0 | 0 | 100 |

FIG. 8

SEARCH ENGINE WITH HIERARCHICALLY STORED INDICES

BACKGROUND OF THE INVENTION

1. Field of the Invention

The invention relates to a search engine, and, more particularly, to a search engine which maps crawled documents into tiers and then searches those tiers in a hierarchical manner.

2. Description of the Related Art

The World Wide Web ("WWW") is a distributed database including literally billions of pages accessible through the Internet. Searching and indexing these pages to produce useful results in response to user queries is constantly a challenge. The device typically used to search the WWW is a search engine. Maintaining a working search engine is difficult because the WWW is constantly evolving, with millions of pages being added daily and existing pages continually changing. Additionally, the cost of search execution typically corresponds directly to the size of the index searched. To deal with the massive size and amount of data in the WWW, most search engines are distributed and use replication and partitioning techniques (all discussed below) to scale down the number of documents.

A typical prior art search engine 50 is shown in FIG. 1. Pages from the internet or other source 100 are accessed through the use of a crawler 102. Crawler 102 aggregates documents from source 100 to ensure that these documents are searchable. Many algorithms exists for crawlers and in most cases these crawlers follow links in known hypertext documents to obtain other documents. The pages retrieved by crawler 102 are stored in a database 108. Thereafter, these documents are indexed by an indexer 104. Indexer 104 builds a searchable index of the documents in database 108. Typical prior art methods for indexing include inverted files, vector spaces, suffix structures, and hybrids thereof. For example, each web page may be broken down into words and respective locations of each word on the page. The pages are then indexed by the words and their respective locations. A primary index of the whole database 108 is then broken down into a plurality of sub-indices (discussed below) and each sub-index is sent to a search node in a search node cluster 106.

In use, a user 112 enters a search query to a dispatcher 110. Dispatcher 110 complies a list of search nodes in cluster 106 to execute the query and forwards the query to those selected search nodes. The compiled list ensures that each partition is searched once. The search nodes in search node cluster 106 search respective parts of the primary index produced by indexer 104 and return sorted search results along with a document identifier and a score to dispatcher 110. Dispatcher 110 merges the received results to produce a final list displayed to the users 112 sorted by relevance scores. The relevance score is a function of the query itself and the type of document produced. Factors that are used for relevance include: a static relevance score for the document such as link cardinality and page quality, superior parts of the document such as titles, metadata and document headers, authority of the document such as external references and the "level" of the references, and document statistics such as query term frequency in the document, global term frequency, and term distances within the document.

Referring now to FIG. 2, a cluster 106 of search nodes is shown. For illustrative purposes, cluster 106 is shown in a matrix grouped in columns 122a, 122b, etc. and rows 124a, 124b, etc. In each column 122 of search nodes, the same set of indices is replicated for each respective search node. For example, the search node in column 122a, row 124a, includes the same subset of indices as the search node in column 122a, 124b. In each row 124 of search nodes, a different subset of indices is used. The indices are equally split so as to divide the amount of time for a search.

For example, the search node in column 122a, row 124a includes a different subset of indices than the search node in column 122b, row 124a. In each search node, "I" represents the index for the entire database 108, "S" corresponds to a search node, "$S_n(I_n)$" indicates that search node n holds sub-index n of the entire index I, and "$S_n^m(I_n)$" indicates that replication number m of search node n holds sub-index n of the entire index I.

Each query from dispatch 110 is sent to respective search nodes so that a single node in every partition is queried. For example, all the nodes in a row 122a, 122b, etc. are queried as the combination of these nodes represents that total index. That is, each row in cluster 120 is a set of search nodes comprising all the partitions of an entire index. The results are merged by dispatcher 110 and a complete result from the cluster is generated. By partitioning data in this way, the data volume is scaled. For example, if there are n columns, then the search time for each node is reduced basically by a factor of n—excluding the time used for merging results by dispatcher 110.

By replicating the search nodes, the query processing rate for each index is increased. In FIG. 2, all search nodes in each column hold the same index. This allows dispatcher 110 to rotate among the nodes in a column for each index partition when selecting a set of search nodes to handle an incoming query.

However, the inventors have determined that there is a highly skewed distribution of unique search queries in a typical search engine. For example, the top 25 queries may account for more than 1% of the total query volume. As a consequence, equally dividing a primary index into smaller sub-indices may not provide optimum results.

Therefore, there is a need in the art for a search engine that organizes its documents and indices in light of the distribution of search queries.

SUMMARY OF THE INVENTION

A search engine comprising a crawler which crawls the WWW and stores pages found on the WWW in a database. An indexer indexes the pages in the database to produce a primary index. A document mapping section maps pages in the database into a plurality of tiers based on a ranking of the pages. The ranking may be based on portions of the pages which have a relatively higher value context. A processor produces a plurality of sub-indices from the primary index based on the mapping. The sub-indices are stored in a search node cluster. The cluster is a matrix of search nodes logically arranged in a plurality of rows and columns. Search nodes in the same column include the same sub-index. Search nodes in the same row include distinct sub-indices. A search query received by a user is sent to a dispatcher which, in turn, forwards the query to the first tier of search nodes. A fall through algorithm is disclosed which indicates when the dispatcher should forward the search query to other tiers of search nodes.

One aspect of the invention is a method for indexing data items in a database. The method comprises retrieving data items from a database and producing a primary index of the data items. The method further comprises mapping the data items on to at least a first tier and a second tier based on respective rankings of the data items. The method further comprises producing at least a first and a second sub-index from the primary index based on the mapping; and storing the at least a first and second sub-index in different search nodes.

Another aspect of the invention is a method for searching a database. The method comprises retrieving data items from a database and producing a primary index of the data items. The method further comprises mapping data items on to at least a first tier and a second tier based on respective rankings of the data items. The method still further comprises producing at least a first and a second sub-index from the primary index based on the mapping. The method further comprises storing the at least a first and second sub-index in different search nodes; receiving a search query; and searching the first tier for result data items relating to the search query.

Yet another aspect of the invention is a system for indexing a database. The system comprises a crawler which crawls the database to find data items. An indexer receives the data items and produces a primary index. A document mapping section maps data items on to at least a first and a second tier based on respective rankings of the data items. A processor produces at least a first and a second sub-index from the primary index based on the mapping. A first search node which stores the first sub-index. A second search node which stores the second sub-index.

Still yet another aspect of the invention is a search node cluster for enabling a search of a database. The cluster comprises search nodes logically arranged in a plurality of columns and plurality of rows. All search nodes in any one of the columns including substantially the same information. All search nodes in any one of the rows including distinct information. The search nodes in the rows being logically divided into at least a first and a second tier. The search nodes in the first tier including an index for a first portion of the database. The search nodes in the second tier including an index for a second portion of the database. The data in the first and second tier is based on respective rankings of the information in the first and second portion of the database.

Yet another aspect of the invention is a search engine comprising a crawler which crawls a database to find data items. An indexer receives the data items and produces a primary index. A document mapping section maps data items on to at least a first and a second tier based on respective rankings of the data items. A processor produces at least a first and a second sub-index from the primary index based on the mapping. A first search node stores the first sub-index. A second search node stores the second sub-index. A dispatch which receives a query and forwards the query to the first search node.

BRIEF DESCRIPTION OF THE DRAWINGS

FIG. 8 is a table showing the values for various variables of a fall through algorithm in accordance with an embodiment of the invention.

DETAILED DESCRIPTION OF THE PREFERRED EMBODIMENTS

Figure 1:
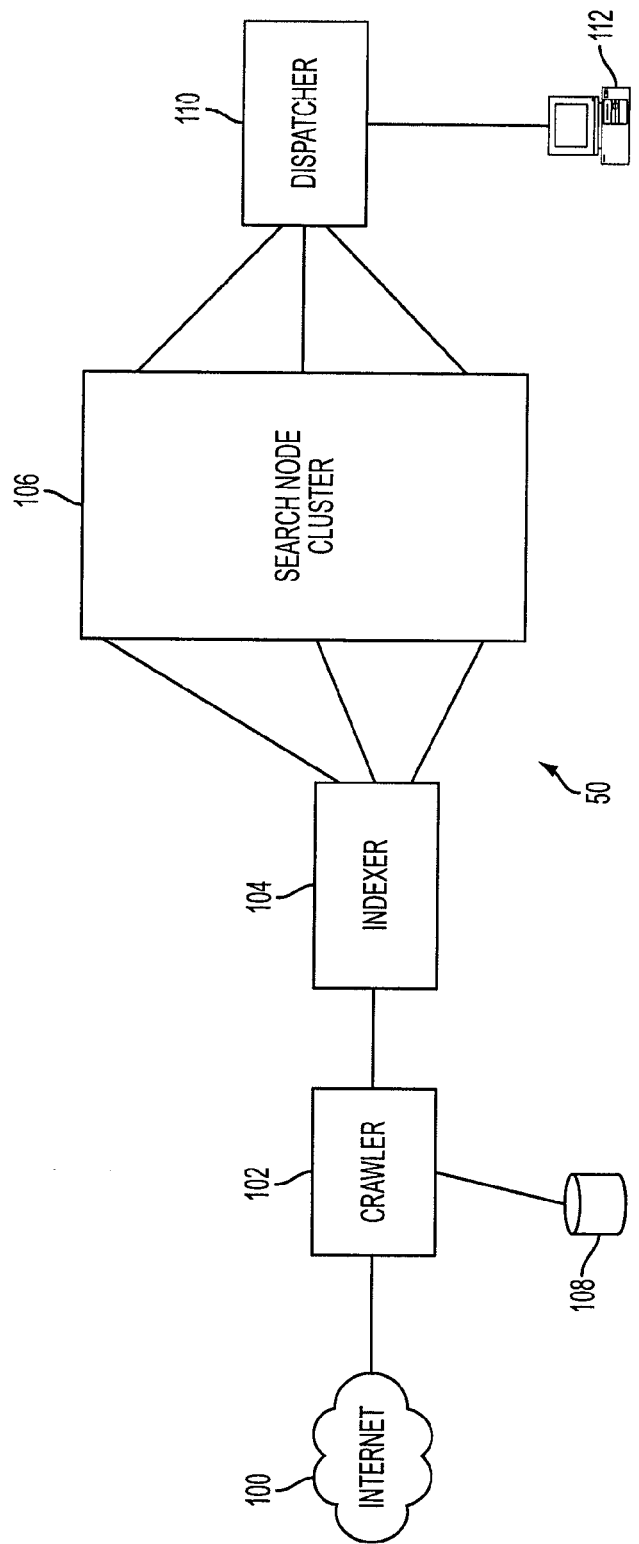
FIG. 1 is a block diagram showing a search engine architecture of the prior art.
Figure 2:
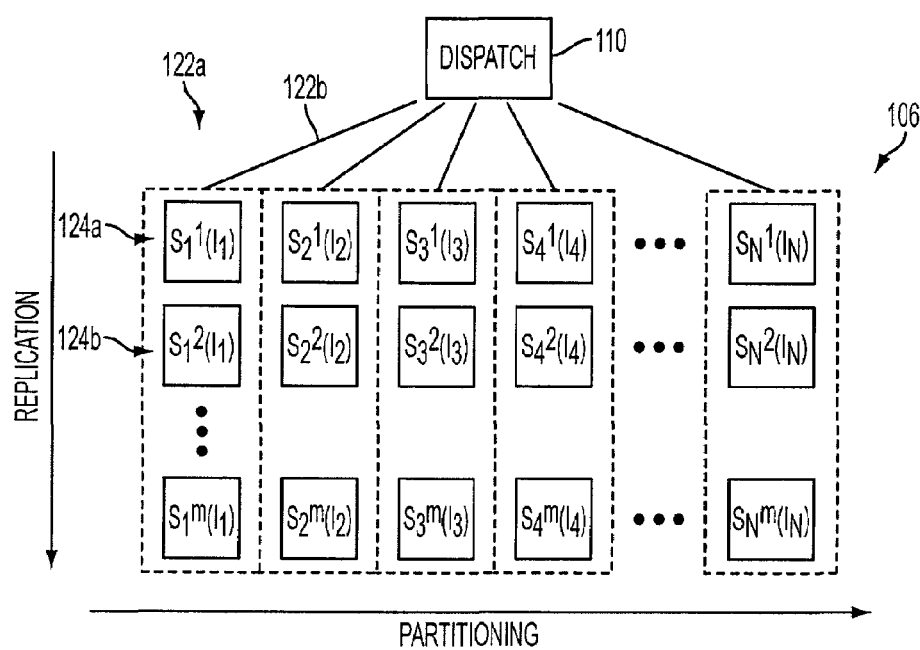
FIG. 2 is a diagram showing a cluster of nodes in accordance with the prior art.
Figure 3:
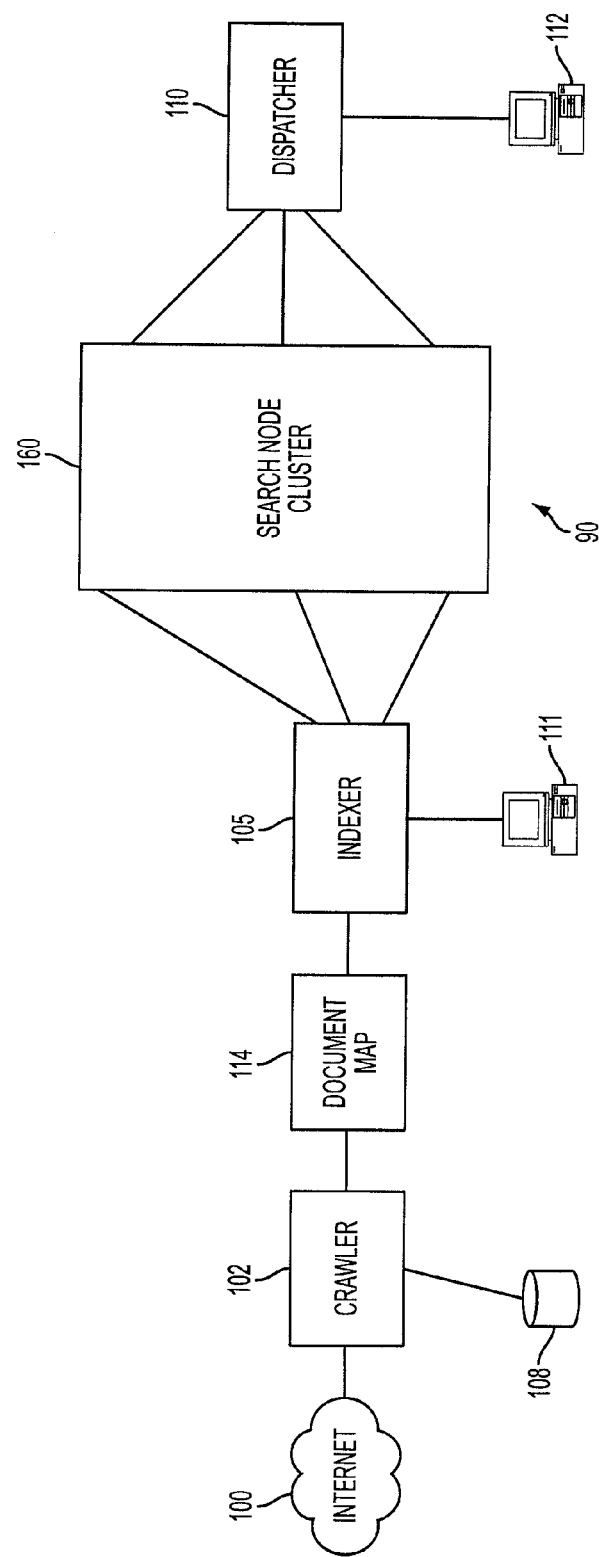
FIG. 3 is a block diagram showing a search engine in accordance with an embodiment of the invention.

Referring to FIG. 3, there is shown a search engine 90 in accordance with an embodiment of the invention. A source of information such as the Internet 100 or other collection of files or documents such as an enterprise or organization network, is crawled by a crawler 102 which, in turn, stores data in a database 108 correspond to the source of information. A document mapping algorithm 114 then maps the documents into tiers as discussed below. An indexer 105, controlled by a processor 111, builds a plurality of sub-indices based on the mapped documents in database 108. A plurality of search nodes in a search node cluster 160 each store respective sub-indices and are each enabled to search their respective sub-indices. A dispatcher 110 sends queries from a user 112 to search node cluster 160 as discussed below.

Recent research yields that there is a skewed distribution of the most popular queries for information on the Internet. For example, most queries (50%–80%) are within the top 1 (one) million most frequently requested queries. Similarly, single days in different months realize an overlap of 80–85% of the same queries. Conversely, only 7% of the queries are asked just once in a similar time period. To take advantage of these facts, the engine uses a disjointed tiered architecture where the indices are not necessarily divided equally.

Figure 4:
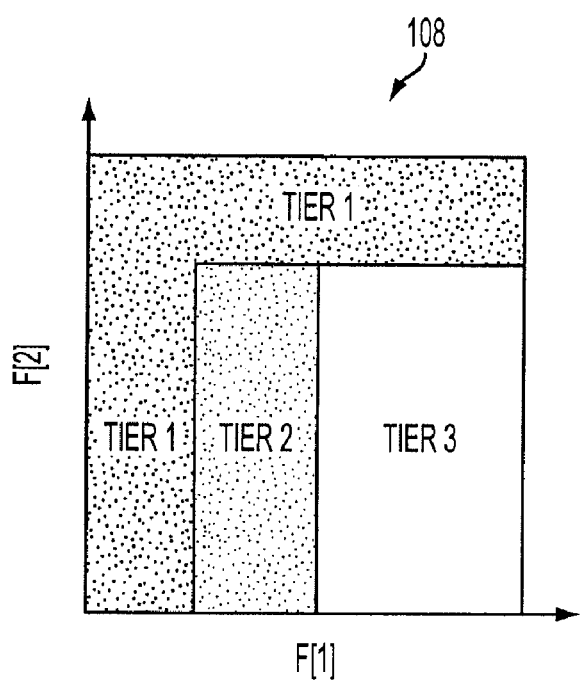
FIG. 4 is a diagram illustrating the function of mapping documents into tiers in accordance with an embodiment of the invention.

Referring now to FIG. 4, each piece of data in database 108 is mapped into one of a plurality of tiers—three tiers are shown in the figure—based on a set of properties. For example, documents which are deemed to have a static relevance ranking, independent of the search query, above a first threshold defined by a database administrator, may be mapped on to Tier I. Documents with a second highest ranking based on another threshold may be mapped to Tier II. As another example, portions of each document or web page can be divided into different tiers. In a particular document, as shown in FIG. 4, the superior context such as headers and anchors, may be placed in Tier I and the body of the document may be placed in Tier II. The mapping is performed periodically on the data on database 108.

Figure 5:
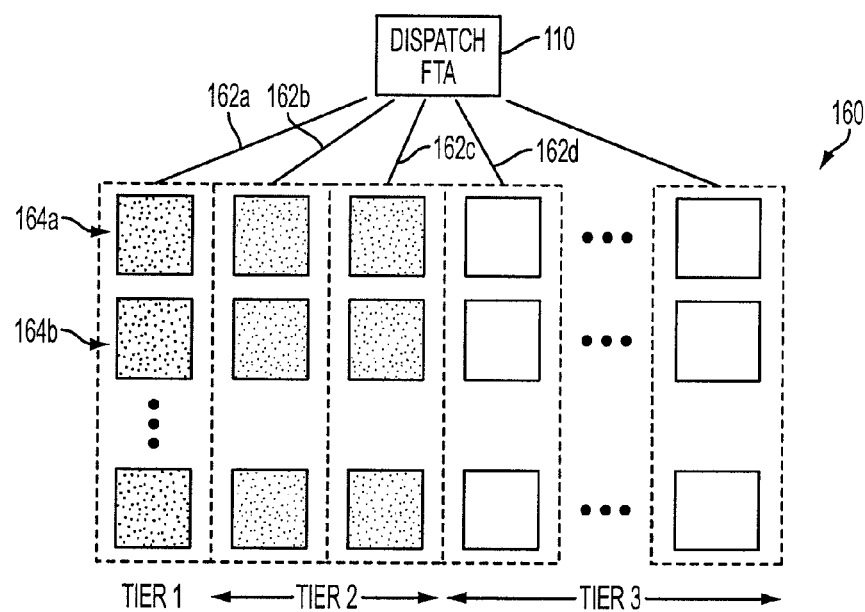
FIG. 5 is a diagram illustrating mapping of documents into tiers and the resulting cluster of nodes in accordance with an embodiment of the invention.

Referring now also to FIG. 5, a data structure (not explicitly shown) is stored in dispatch 110 so that search nodes in cluster 160 are logically assigned to particular tiers. After the documents in database 108 are mapped into tiers by document mapping algorithm 114, indexer 105 produces a plurality of corresponding sub-indices based on the tiers. The sub-indices are stored in respective search nodes in cluster 160. Cluster 160 includes logical columns 162a, 162b, 162c, etc. and logical rows 164a, 164b, etc. of search nodes. While the nodes are shown as being physically disposed in columns and rows, clearly the nodes need not be so physically disposed as long as they are logically arranged in a similar manner.

Search nodes in each column 162 include replications of the same sub-indices so that dispatcher 110 may cycle through a plurality of search nodes. Search nodes in each row 164 include different sub-indices. For example, as shown in FIG. 5, the search nodes in column 162a all include information from Tier I. Thus, documents determined to be mapped to Tier I by algorithm 114, are so mapped, a sub-index is created in indexer 105, and this sub-index for Tier I is stored in the search nodes in column 162a.

Similarly, the search nodes in column 162b include a portion of the information in Tier II. Search nodes in column 162c include the remainder of the information from Tier II that was not included in the search nodes in column 162b. Two search node columns are shown for Tier II, and the indices may be split equally among these nodes. Clearly, any number of nodes could be used.

Similarly, search nodes in column 162d include a portion of the information from Tier III. To facilitate the illustration of cluster 160, the nodes in each column are shown as being equal in size though it is clear that each node may include the same or a different amount of information than other nodes in the same row. For example, the node in column 162a, row 164a will probably have less information than the node in column 162b, row 164a because they are in different tiers. As an example of the shown tiered architecture, 1.5 million documents may be indexed in all of the Tier 1 nodes, 6 million documents indexed in all of the Tier 2 nodes, and 10 million documents indexed in all of the Tier 3 nodes.

Each inquiry from dispatch 110 is first searched in the indices of Tier 1 and then the search continues to indices of other tiers based on a fall through algorithm ("FTA") stored in dispatcher 110. The FTA determines whether a query should continue to be executed in other tiers and also determines how results from multiple tiers should be merged. Stated another way, the FTA determines the path of the query in the set of tiers based on criteria such as relevance scores and number of hits in a result set. It also determines how many results from each tier can be used before the next tier is consulted.

The FTA uses a plurality of variables to determine whether a next tier should be evaluated including hitlimit, percentlimit, ranklimit, termranklimit, and minusablehits. The variable hitlimit is the evaluation of the number of hits to be used from a tier before a fall-through to the next tier may be forced. For example, for a jump from tier 1 to 2, the hitlimit may be 1000 and for a jump from tier 2 to 3, the hitlimit may be 8100. Percentlimit is the maximum percentage of hits from a tier that may be used before fall-through to a next tier may be forced. If the number of hits in a given tier is less than the percentlimit of the requested results overall, a fall-through occurs. For example, for a jump from tier 1 to 2, the percentlimit may be 10 and for a jump from tier 2 to 3, the percentlimit may be 30. Termranklimit—if the relevance score of a hit being considered is less than another variable Ranklimit plus the termranklimit value times the number of terms in the query, then fall-through to the next tier is forced. For example, for a jump from tier 1 to 2, the ranklimit may be 200 and the termranklimit 400. For example, in a two-term query, the relevancy score for a hit to pass this criteria would be 200+(2×400)=1000. For a jump from tier 2 to 3, the ranklimit may be 0 and the termranklimit 0.

Minusablehits—The number of hits that should pass the above criteria for the FTA for a given tier for there not to be an immediate fall-through to the next tier. This number is typically the number of results presented to a user on a result page. The idea is that if it is known that fall-through will be needed in order to produce the number of hits most often requested, then the fall-through should be done as soon as possible. This variable should be used with a constant value. For example, for a jump from tier 1 to 2, minusablehits may be 0 and for a jump from tier 2 to 3, the minusablehits may be 100.

As Tier 2 will only process those queries which pass through Tier 1, and Tier 3 will only process those queries which pass through both Tiers 1 and 2, it is desirable that Tier I have the highest performance nodes. Extra capacity at Tiers 2 and 3 may be achieved by replicated columns or by reducing the number of documents at each node.

In the embodiment in FIG. 5, a 1 dimensional tier-ing configuration is used in that all documents and corresponding indices are distributed using a static relevance score. For instance, the static relevance score may be based on link cardinality, link popularity, or site popularity on the web.

For example, in a database of one billion records, the top 30 million documents, based on static relevance, are mapped to Tier 1, the next 360 million documents are mapped to Tier 2 and the following 610 million documents mapped to Tier 3. One drawback to this configuration is that using static relevance is only part of the overall formula used for determining a relevant document.

Figure 6:
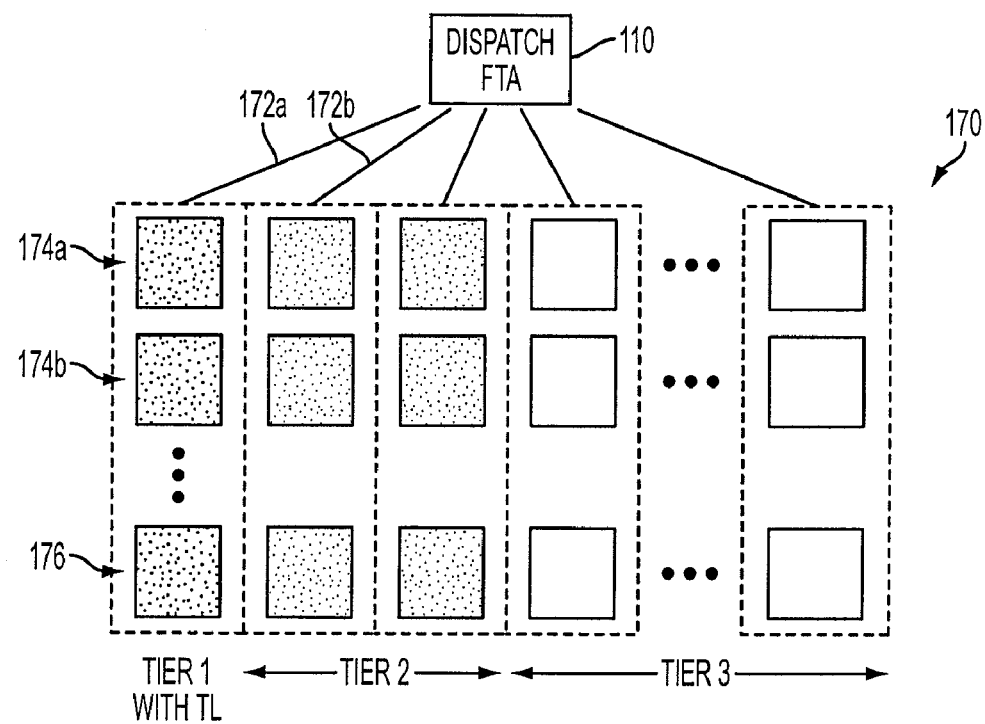
FIG. 6 is a diagram illustrating mapping of documents into tiers and the resulting cluster of nodes in accordance with an embodiment of the invention.

Referring now to FIG. 6, there is shown another cluster of nodes 170 in accordance with the invention. Cluster 170 could be used in place of cluster 160 and includes nodes in columns 172a, 172b etc. and rows 174a, 174b, etc. In this embodiment, a 1.5 dimensional configuration is realized. A query log is run for the 1 million most common queries for a period of time. The first 20 hits for each of the one million queries are mapped to Tier 1 as shown at 176 in FIG. 6. This may be approximately five million documents. The remaining documents are distributed according to a static relevance score. For example, for a billion document database, the top 30 million documents are mapped to Tier 1 (with 5 million of those documents being locked into this tier), 360 million documents mapped to Tier 2 and 610 million documents mapped to Tier 3. A FTA is used as discussed above.

Figure 7:
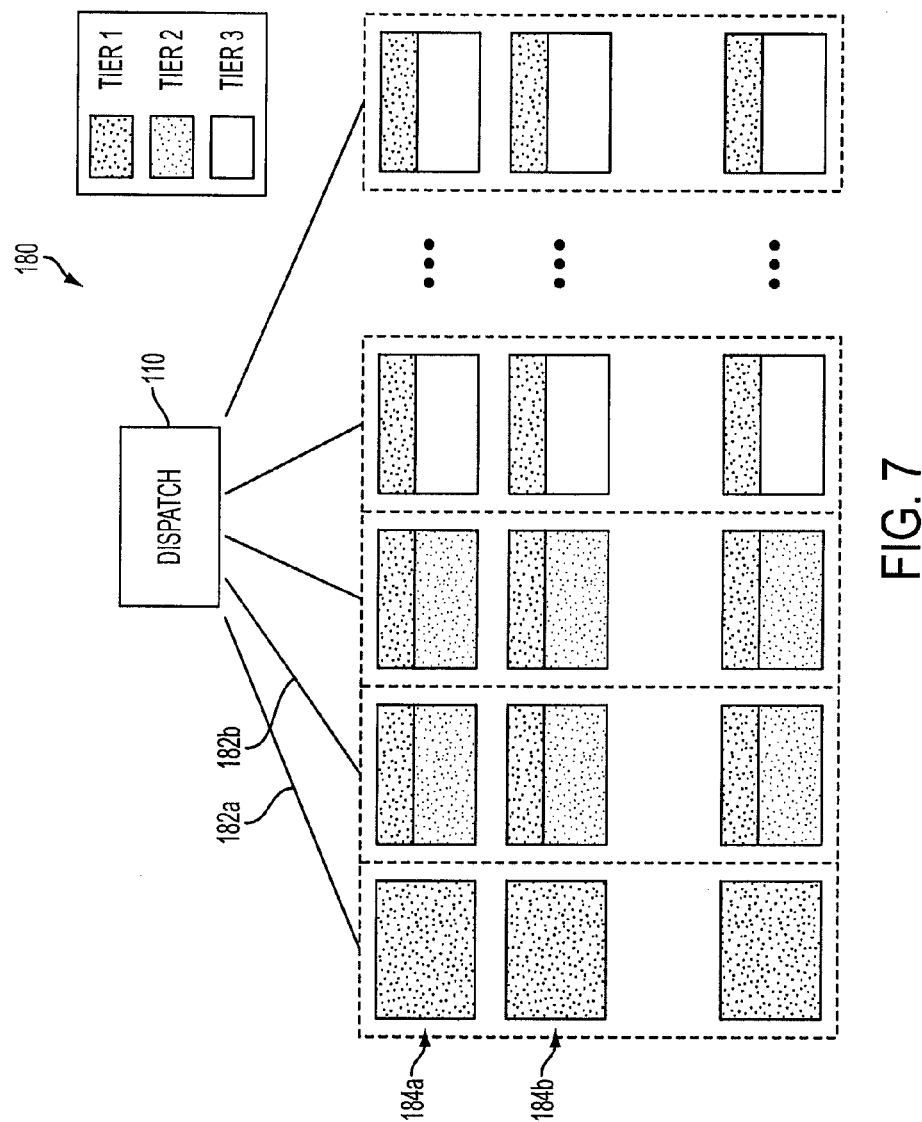
FIG. 7 is a diagram illustrating mapping of documents into tiers and the resulting cluster of nodes in accordance with an embodiment of the invention.

Referring now to FIG. 7, there is shown another cluster of nodes 180 in accordance with the invention. Cluster 180 can be used in place of cluster 160 and includes nodes in columns 182a, 182b etc. and rows 184a, 184b, etc. In this embodiment, a 2 dimensional configuration is realized. In the embodiment of FIG. 7, the same tier distribution as the 1.5 dimensional configuration of FIG. 6 is optionally used. However, information in high value contexts for all documents is searched first simultaneous with Tier I. These high value contexts are the most important portions of the respective web pages when determining dynamic relevancy of a document. These portions include the title, anchors, etc.

If more hits are needed, the full index is continually searched using the multi-tier configuration while removing duplicates from the returned results. For example, the body context of the top 30 million documents (with 5 million locked as discussed above) are mapped to Tier 1, the body context of the 360 million documents mapped to Tier 2 and the body context of the 610 million documents mapped to Tier 3. A new Tier 0 is used which includes the superior context of all 1 billion documents. Some values for the variables of the FTA for the architecture of cluster 180, is shown in FIG. 8. An optional tier 4 may be used with low value documents. Such documents may be pure links or spam documents. By searching the high volume contexts of all the tiers in tier 0, the invention takes advantage of the fact that searching a relatively small subset of the information in the tier 2 and tier 3 nodes is much cheaper than searching the full information indexed in these nodes.

Figure 9:
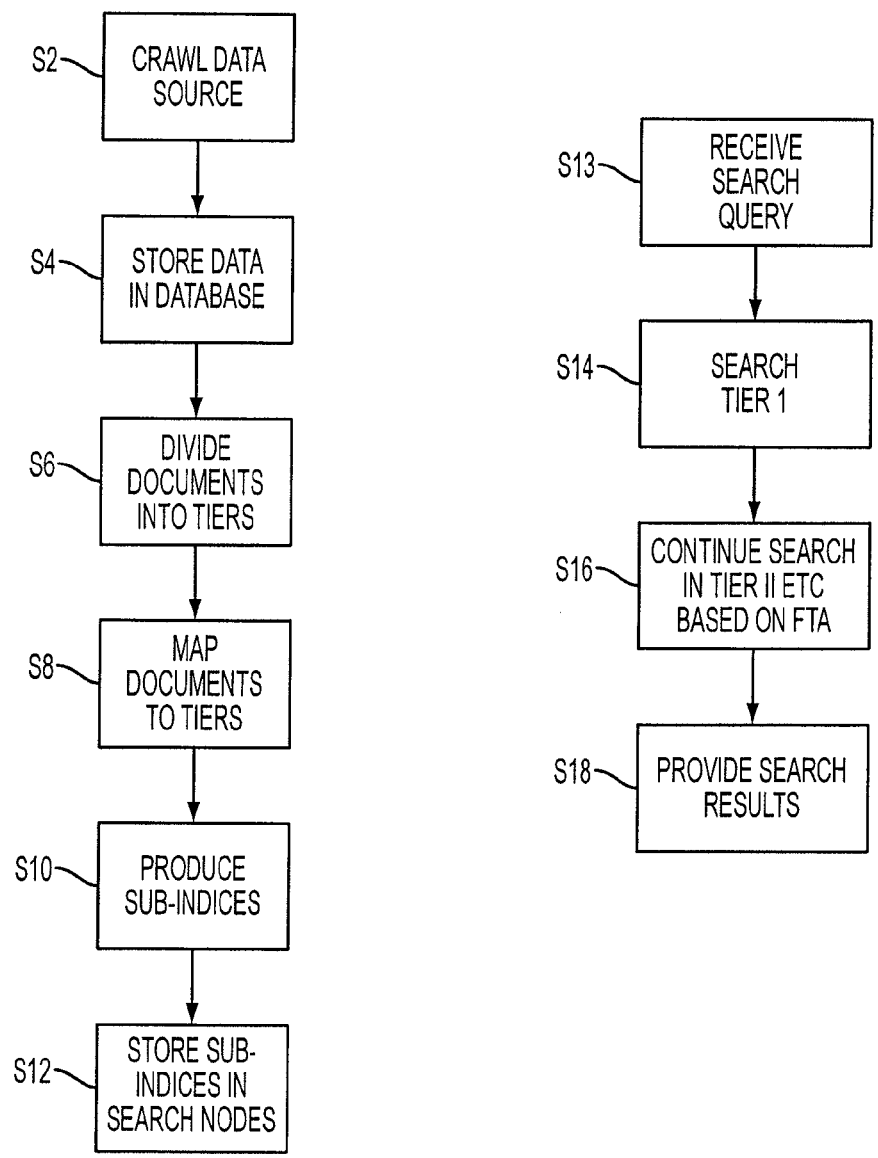
FIG. 9 is a flow chart showing the operation of a searching algorithm in accordance with an embodiment of the invention.

Referring now to FIG. 9, there is shown a flow chart summarizing some of the operations of the invention. At S2, a search engine crawls a data source. At S4, documents gathered from the data source are stored in a database. At S6, the documents are divided into tiers using one of the algorithms discussed above. At S8, the documents are mapped into the determined tiers. At S10, sub-indices are produced based on the determined tiers. At S12, the sub-indices are stored in respective search nodes in a search node cluster. At S13, a search query is received from a user. At S14, the search engine searches the indices in Tier I. At S16, based on the FTA, the search engine searches Tier II search nodes and any other Tier search nodes. At S18, results of the search are provided for a user.

Thus, by mapping documents crawled in a database into disjointed tiers, a faster, more cost effective search engine is realized. Further, by providing a fall through algorithm that dynamically determines how many of these tiers are searched, scaling of the database is improved.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for indexing data items in a database, the method comprising:
   retrieving data items associated with a respective ranking from a database, wherein the ranking is based at least in part on a relevance score for the data item;
   mapping the data items on to at least a first tier and a second tier based on the respective rankings of the data items;
   producing at least a first and a second sub-index from the primary index based on the mapping;
   storing the first sub-index in a first plurality of search nodes logically arranged in a first plurality of columns; and
   storing the second sub-index in a second plurality of search nodes logically arranged in a second plurality of columns.

2. The method as recited in claim 1, wherein the database is a collection of pages and documents available through the World Wide Web.

3. The method as recited in claim 1, further comprising:
   executing a search query log for a number of queries on the database; and
   receiving the results of the search query log;
   wherein the first sub-index is based on the results of the query log.

4. The method as recited in claim 1, further comprising:
   executing a search query log for a number of queries on the database; and
   receiving the results of the search query log;
   wherein the first sub-index is based on the results of the query log.

5. The method as recited in claim 1, wherein the mapping is based on a value context of the data items.

6. The method as recited in claim 1, wherein the data items are web pages and mapping is based on a relevance score of the web pages.

7. The method of claim 1, wherein the first and second sub-index are logically arranged in a respective plurality of logical rows.

8. A method for searching a database, the method comprising:
   retrieving data items associated with a respective ranking from a database, wherein the ranking is based at least in part on a relevance score for the data item;
   mapping data items on to at least a first tier and a second tier based on the respective rankings of the data items;
   producing at least a first and a second sub-index from the primary index based on the mapping;
   storing the first sub-index in a first plurality of search nodes logically arranged in a first plurality of columns;
   storing the second sub-index in a second plurality of search nodes logically arranged in a second plurality of columns;
   receiving a search query; and
   searching the first tier for result data items relating to the search query and providing one or more of the result data items to a user.

9. The method as recited in claim 8, further comprising:
   searching the second tier for the result data items relating to the search query when the first tier does not yield a threshold number of result data items.

10. The method as recited in claim 8, wherein the second tier is searched when the first tier does not yield a threshold number of result data items.

11. The method of claim 8, wherein the first and second sub-index are logically arranged in a respective plurality of logical rows.

12. A system for indexing a database, the system comprising:
   a crawler which crawls the database to find data items;
   an indexer which receives the data items associated with a respective ranking, wherein the ranking is based at least in part on a relevance score for the data item, produces a primary index;
   a document mapping section which maps data items on to at least a first and a second tier based on the respective rankings of the data items;
   a processor which produces at least a first and a second sub-index from the primary index based on the mapping;
   a first plurality of search nodes logically arranged in a first plurality of columns for storing the first sub-index; and
   a second plurality of search nodes logically arranged in a second plurality of columns for storing the second sub-index.

13. A search engine comprising:
   a crawler which crawls a database to find data items;
   an indexer which receives the data items associated with a respective ranking wherein the ranking is based at least in part on a relevance score for the data item, produces a primary index;
   a document mapping section which maps data items on to at least a first and a second tier based on the respective rankings of the data items;
   a processor which produces at least a first and a second sub-index from the primary index based on the mapping;
   a first plurality of search nodes logically arranged in a first plurality of columns for storing the first sub-index;
   a second plurality of search nodes logically arranged in a second plurality of columns for storing the second sub-index; and a dispatcher which receives a query and forwards the query to a search node in the first plurality of search nodes.

14. The search engine as recited in claim 13, wherein the first and second sub-index are logically arranged in a respective plurality of logical rows.

15. The search engine as recited in claim 13, wherein the dispatcher sends the query to the second tier when the first tier did not produce a thresholds number of result data items.

16. The search engine as recited in claim 13, wherein the dispatcher sends the query to the second tier when the first tier does not yield a threshold number of result data items.

17. The system of claim 12, wherein the first and second sub-index are logically arranged in a respective plurality of logical rows.

* * * * *